US012206785B2

United States Patent
Fister et al.

(10) Patent No.: US 12,206,785 B2
(45) Date of Patent: Jan. 21, 2025

(54) SECURITY DEVICE COMPUTATION MATCHING

(71) Applicant: Lexmark International, Inc., Lexington, KY (US)

(72) Inventors: Zachary Nathan Fister, Lexington, KY (US); Timothy John Rademacher, Lexington, KY (US); Jennifer Topmiller Williams, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 483 days.

(21) Appl. No.: 17/498,230

(22) Filed: Oct. 11, 2021

(65) Prior Publication Data
US 2022/0303138 A1 Sep. 22, 2022

Related U.S. Application Data

(60) Provisional application No. 63/163,385, filed on Mar. 19, 2021.

(51) Int. Cl.
*H04L 9/32* (2006.01)
*H04L 9/08* (2006.01)
*H04L 9/14* (2006.01)

(52) U.S. Cl.
CPC .......... *H04L 9/3234* (2013.01); *H04L 9/0877* (2013.01); *H04L 9/14* (2013.01); *H04L 2209/12* (2013.01)

(58) Field of Classification Search
CPC ....... H04L 9/3234; H04L 9/0877; H04L 9/14; H04L 2209/12; G06F 2221/2129; G06F 21/44
See application file for complete search history.

(56) References Cited

U.S. PATENT DOCUMENTS

| | | | | |
|---|---|---|---|---|
| 6,442,525 | B1 * | 8/2002 | Silverbrook | H01L 23/576 |
| | | | | 235/382 |
| 7,228,434 | B2 * | 6/2007 | Zisowski | G06F 21/52 |
| | | | | 713/193 |
| 7,650,504 | B2 * | 1/2010 | Bodrov | G06F 21/51 |
| | | | | 713/1 |
| 10,171,804 | B1 * | 1/2019 | Wang | H04N 19/127 |
| 10,933,646 | B2 * | 3/2021 | Bonneton | G06F 21/62 |
| 2002/0154769 | A1 * | 10/2002 | Petersen | G06F 7/586 |
| | | | | 380/42 |
| 2005/0206694 | A1 * | 9/2005 | Wadley | B41J 2/17543 |
| | | | | 347/85 |

(Continued)

*Primary Examiner* — Khalid M Almaghayreh

(57) ABSTRACT

A method for determining authenticity of a supply item for an imaging system, the method comprising: performing a cryptographic algorithm on the imaging system, starting with a first algorithm input, performing the cryptographic algorithm on the supply item, starting with the first algorithm input, determining authenticity of the supply item based on an imaging system run time and a supply item run time, wherein the imaging system run time is a run time of the cryptographic algorithm on the imaging system from input of the first algorithm input until a result output is generated, and the supply item run time is a run time of the cryptographic algorithm on the supply item from input of the first algorithm input until the result output is generated.

3 Claims, 4 Drawing Sheets

(56) References Cited

U.S. PATENT DOCUMENTS

| 2006/0020936 | A1* | 1/2006 | Wyatt | G06F 9/4411 |
| | | | | 717/162 |
| 2018/0157571 | A1* | 6/2018 | Lünstroth | G06F 11/3457 |
| 2021/0126846 | A1* | 4/2021 | Yi | H04L 45/121 |
| 2022/0035812 | A1* | 2/2022 | Balaraman | G06F 16/24535 |

* cited by examiner

SECURITY DEVICE COMPUTATION MATCHING

CROSS REFERENCE TO RELATED APPLICATIONS

This application claims priority and benefit under 35 U.S.C. 119(e) from U.S. provisional application No. 63/163,385 titled "Security Device Computation Matching," having a filing date of Mar. 19, 2021.

BACKGROUND

1. Technical Field

The present disclosure generally relates to methods and systems for determining the authenticity of a component, and, more particularly, methods and systems for determining the authenticity of a supply item component within an imaging device.

2. Description of the Related Art

In electronic systems, it is often desirable to confirm the authenticity of a component of the electronic system to ensure that the entire system operates as designed. Non-authentic components employ various techniques to mimic the behavior of authentic components. This may include copying the authentic component's circuits and memory contents in order to duplicate authentication algorithms or encrypted communication between the component and the rest of the electronic system. This is particularly important in printing systems where it is desirable to confirm the authenticity of a supply component of the printing system to ensure correct operation.

Non-authentic components may utilize different resources than an authentic component in order to accomplish similar behavior. For example, an encryption scheme done via a hardware circuit on the authentic component may be implemented on a non-authentic component via firmware running on a programmable microcontroller. This makes it easier to produce a non-authentic component which passes as an authentic component.

Accordingly, there is a need for improved systems and methods for determining the authenticity of a component to thwart the use of non-authentic components.

SUMMARY

The present disclosure provides example methods and systems that may be implemented in any general electronic system or specifically in an imaging/printing device/system to thwart the use of non-authentic components.

There is provided a method for determining authenticity of a supply item for an imaging device, the method comprising: performing a cryptographic algorithm on the imaging device, starting with a first algorithm input, performing the cryptographic algorithm on the supply item, starting with the first algorithm input, determining authenticity of the supply item based on an imaging device run time and a supply item run time, wherein the imaging device run time is a run time of the cryptographic algorithm on the imaging device from input of the first algorithm input until a result output is generated, and the supply item run time is a run time of the cryptographic algorithm on the supply item from input of the first algorithm input until the result output is generated.

In certain implementations, the imaging device run time is a run time of the cryptographic algorithm on the imaging device until a result output is generated, and the supply item run time is a run time of the cryptographic algorithm on the supply item until the result output is generated. The run times may begin at input of the first algorithm input or at a predetermined time later, or after a predetermined number of iterations of the cryptographic algorithm.

In certain implementations, the cryptographic algorithm is an iterative cryptographic algorithm. In certain implementations, the cryptographic algorithm is of a type that results in consistent timing when the same first algorithm input is used. When the first algorithm input and/or the result output is changed, the time to complete the cryptographic algorithm also changes.

In certain implementations, the cryptographic algorithm is a symmetric encryption algorithm, for example AES or 3DES. The input data may be encrypted, then the encrypted output may be repeatedly re-encrypted until the output data is equal to the result output. The run time is measured from the start of the first encryption to the completion of a subsequent encryption in which the match occurs. In certain implementations, the cryptographic algorithm is a hash function.

If the first algorithm input and the result output are unchanged between runs, the run time of the cryptographic algorithm should be consistent because the same number of cryptographic operations have occurred. If one or both of the first algorithm input and the result output are changed, the run time changes because a different number of cryptographic operations are required to find a match.

In certain implementations, the step of determining authenticity comprises determining that the supply item is not authentic when the supply item run time is greater than an upper run time threshold, the upper run time threshold being based on the imaging device run time.

In certain implementations, the upper run time threshold is the imaging device run time plus an upper variance.

In certain implementations, the upper variance is a percentage of the imaging device run time, for example, 20% or 10%. In certain implementations, the upper variance is a pre-set time, such as 2 ms.

In certain implementations, the step of determining the authenticity further comprises determining that the supply item is not authentic when supply item run time is less than a lower run time threshold, the lower run time threshold being based on the imaging device run time.

In certain implementations, the lower run time threshold is the imaging device run time minus a lower variance.

In certain implementations, the lower variance is a percentage of the imaging device run time, for example, 20% or 10%. In certain implementations, the lower variance is a pre-set time, such as 2 ms.

In certain implementations, the step of determining the authenticity comprises determining that the supply item is authentic when the supply item run time is between the upper run time threshold and the lower run time threshold.

In certain implementations, the method further comprises: generating parameters for the cryptographic algorithm, the parameters including the first algorithm input to the cryptographic algorithm and including a second parameter.

In certain implementations, the second parameter is the imaging device run time and the method further comprises: recording an algorithm output as the result output when the cryptographic algorithm has been performed for the imaging device run time on the imaging device. In certain implementations, generating the imaging device run time comprises randomly selecting a run time, the run time being less than a maximum run time.

In certain implementations, the second parameter comprises matching data indicative of the result output and when the cryptographic algorithm on the imaging device has produced the result output, the run time of the algorithm is recorded as the imaging device run time.

In certain implementations, the matching data has a smaller number of bits than the result output.

In certain implementations, the second parameter is the supply item run time and the method further comprises: recording an algorithm output as the result output when the cryptographic algorithm has been performed for the supply item run time on the supply item. The supply item may send the result output to the imaging device.

In certain implementations, the imaging device performs the cryptographic algorithm until it returns the result output and records the imaging device run time.

In certain implementations, the imaging device generates the parameters for the cryptographic algorithm. In certain implementations, the imaging device sends the parameters to the supply item.

In certain implementations, the supply item run time is determined using an internal timer of the supply item.

In certain implementations, the supply item sends an indication of the supply item run time to the imaging device. The indication of the supply item may be the recorded supply run time, or other data indicating the supply run time.

In certain implementations, the imaging device performs determination of authenticity of the supply item.

In certain implementations, the method further comprises: when the algorithm output on the supply item matches the result output, recording the run time of the algorithm on the supply item as the supply item run time. The recorded supply run time can then be used with the imaging device run time in the determination of authenticity.

In certain implementations, the method further comprises: when the result output is achieved on the imaging device, continuing performance of the cryptographic algorithm on the imaging device until a maximum run time is reached, the maximum run time measured from input of the first algorithm input, and/or when the result output is achieved on the supply item, continuing performance of the cryptographic algorithm on the supply item until the maximum run time is reached, the maximum run time measured from input of the first algorithm input.

In certain implementations, the method further comprises: performing one or more dummy checks and/or comparisons of the algorithm output and the result output during performing the cryptographic algorithm on the imaging device. For example, after each run of the cryptographic algorithm, the imaging device may check if the result is equal to an arbitrary result and then continue the process regardless.

In certain implementations, when the maximum run time has been reached on the supply item and the result output has not been generated on the supply item, the supply item sends an error message to the imaging device.

In certain implementations, performing the cryptographic algorithm on the imaging device comprises performing the cryptographic algorithm on a security device of the imaging device. The security device of the imaging device may be integral with the imaging device SoC or the security device of the imaging device may be integral with another component of the imaging device, such as a second supply item, for example a fusing component or an imaging unit. In certain implementations, the security device of the imaging device comprises a processor and optionally, one or more hardware encryption components, such as a hardware AES chip, a hardware DES chip and/or a hardware SHA chip.

In certain implementations, performing the cryptographic algorithm on the supply item comprises performing the cryptographic algorithm on a security device of the supply item. In certain implementations, the security device of the supply item comprises a processor and optionally, one or more hardware encryption components, such as a hardware AES chip, a hardware DES chip and/or a hardware SHA chip.

In certain implementations, the method further comprises: generating the imaging device run time and corresponding imaging device intermediate data from a look-up table, retrieving, by the supply item, supply item intermediate data from a look-up table on the supply item based on the supply item run time, and determining the supply item is authentic when the imaging device intermediate data and the supply item intermediate data match. The supply item intermediate data and the imaging device intermediate data act as an indication of the supply item and imaging device run times respectively. In this way, checking if the supply item and imaging device intermediate data match determines the authenticity of the supply item based on the supply item run time and the imaging device run time. In certain implementations, determining the supply item is authentic when the imaging device intermediate data and the supply item intermediate data match comprises performing an authentication operation on the imaging device intermediate data and the supply item intermediate data.

In certain implementations, generating the imaging device run time and corresponding imaging device intermediate data from the look-up table comprises selecting a row in the look-up table, the row including a run time and a piece of intermediate data.

In certain implementations, the selection may be a random selection from a group of existing rows.

In certain implementations, retrieving, by the supply item, supply item intermediate data from a look-up table on the supply item based on the supply item run time comprises selecting a row in the look-up table, the row having a run time matching the supply item run time. The row run time and the supply item run time may be considered matching when the supply item run time is within a specified range on the row run time. For example, the specified range may be +/−20% or 10% of the row run time, or the specified range may be +/−2 ms of the row run time. In certain implementations, if the supply item run time does not match to a run time in the look-up table, the supply item communicates an error to the imaging device.

The parameters, for example the first algorithm input and/or the imaging device run time and/or the matching data and/or the supply item run time and/or the look-up table may be changed. This changing of parameters may occur periodically, at start-up of the imaging device, or on initiation of communication between the imaging device and the supply item.

The look-up table may be stored and shared between the imaging device and the supply item in baseline software or may be programmed during personalisation.

In certain implementations, the imaging device intermediate data and the supply item intermediate data are each a key, seed, salt or algorithm.

In certain implementations, the cryptographic algorithm is hardware assisted. The cryptographic algorithm may be a SHA, AES, DES, 3DES or any other hardware assisted algorithm.

In certain implementations, the cryptographic algorithm is a processor-based algorithm. A processor-based algorithm may be performed on a general-purpose processor.

In certain implementations, the method further comprises: performing a second cryptographic algorithm on the imaging device, starting with a second algorithm input, performing the second cryptographic algorithm on the supply item, starting with the second algorithm input, determining the authenticity of the supply item based on a second imaging device run time and a second supply item run time, wherein the second imaging device run time is a run time of the second cryptographic algorithm on the imaging device from input of the second algorithm input until a second result output is generated, and the second supply item run time is a run time of the second cryptographic algorithm on the supply item from input of the second algorithm input until the second result output is generated.

In certain implementations, the cryptographic algorithm is a processor-based algorithm and the second cryptographic algorithm is a hardware-assisted algorithm.

There is further provided a method for determining authenticity of a supply item for an imaging device, the method comprising: generating a first algorithm input for a cryptographic algorithm, selecting an imaging device run time from a set of predetermined run times, wherein each of the predetermined run times has corresponding intermediate data, setting the intermediate data corresponding to the selected run time as imaging device intermediate data, performing the cryptographic algorithm on the imaging device, starting with the first algorithm input, recording an algorithm output as a result output when the cryptographic algorithm has been performed for the imaging device run time on the imaging device, sending the first algorithm input and the result output to the supply item, performing the cryptographic algorithm on the supply item, starting with the first algorithm input, recording the run time of the algorithm on the supply item as the supply item run time, when the algorithm output on the supply item matches the result output, retrieving, from memory on the supply item, supply item intermediate data corresponding to the supply item run time, determining the supply item is authentic when the imaging device intermediate data and the supply item intermediate data match.

In certain implementations, the imaging device intermediate data is a key, and the supply item intermediate data is a key. In certain implementations, the imaging device intermediate data is a seed, and the supply item intermediate data is a seed. In certain implementations, the imaging device intermediate data is an algorithm, and the supply item intermediate data is an algorithm. In certain implementations, determining the supply item is authentic when the imaging device intermediate data and the supply item intermediate data match comprises performing an authentication operation on the imaging device intermediate data and the supply item intermediate data.

In certain implementations, each of the predetermined run times corresponds to a different key, seed or algorithm.

There is further provided a method for determining authenticity of a supply item for an imaging device, the method comprising: performing a cryptographic algorithm on a component of the imaging device, starting with a first algorithm input, performing the cryptographic algorithm on the supply item, starting with the first algorithm input, determining authenticity of the supply item based on an imaging device run time and a supply item run time, wherein the imaging device run time is a run time of the cryptographic algorithm on the component of the imaging device from input of the first algorithm input until a result output is generated, and the supply item run time is a run time of the cryptographic algorithm on the supply item from input of the first algorithm input until the result output is generated.

In certain implementations, the component of the imaging device system is a second supply item.

There is further provided an imaging system comprising: an imaging device; and a supply item, the supply item being communicatively connectable to the imaging device, wherein the imaging system is configured to: perform a cryptographic algorithm on the imaging device, starting with a first algorithm input, perform the cryptographic algorithm on the supply item, starting with the first algorithm input, and determine authenticity of the supply item based on an imaging device run time and a supply item run time, wherein the imaging device run time is a run time of the cryptographic algorithm on the imaging device from input of the first algorithm input until a result output is generated, and the supply item run time is a run time of the cryptographic algorithm on the supply item from input of the first algorithm input until the result output is generated.

In certain embodiments, the imaging device comprises an imaging device security device, and/or the supply item comprises a supply item security device. In certain embodiments, the imaging device comprises a second supply item and optionally, the second supply item comprises a security device that acts as the imaging device security device. In certain embodiments, the security device of the imaging device and/or supply item comprises a processor and optionally, one or more hardware encryption components, such as a hardware AES chip, a hardware DES chip and/or a hardware SHA chip.

There is provided a method for determining authenticity of a component for an electronic device, the method comprising: performing a cryptographic algorithm on the electronic device, starting with a first algorithm input, performing the cryptographic algorithm on the component, starting with the first algorithm input, determining authenticity of the component based on an electronic device run time and a component run time, wherein the electronic device run time is a run time of the cryptographic algorithm on the electronic device from input of the first algorithm input until a result output is generated, and the component run time is a run time of the cryptographic algorithm on the component from input of the first algorithm input until the result output is generated.

In certain implementations, the cryptographic algorithm is an iterative cryptographic algorithm. In certain implementations, the cryptographic algorithm is of a type that results in consistent timing when the same first algorithm input is used. When the first algorithm input and/or the result output is changed, the time to complete the cryptographic algorithm also changes.

In certain implementations, the cryptographic algorithm is a symmetric encryption algorithm, for example AES or 3DES. The input data may be encrypted, then the encrypted output may be repeatedly re-encrypted until the output data is equal to the result output. The run time is measured from the start of the first encryption to the completion of a subsequent encryption in which the match occurs. In certain implementations, the cryptographic algorithm is a hash function.

If the first algorithm input and the result output are unchanged between runs, the run time of the cryptographic algorithm should be consistent because the same number of cryptographic operations have occurred. If one or both of the first algorithm input and the result output are changed, the run time changes because a different number of cryptographic operations are required to find a match.

In certain implementations, the step of determining authenticity comprises determining that the component is not authentic when the component run time is greater than an upper run time threshold, the upper run time threshold being based on the electronic device run time.

In certain implementations, the upper run time threshold is the electronic device run time plus an upper variance.

In certain implementations, the upper variance is a percentage of the electronic device run time, for example, 20% or 10%. In certain implementations, the upper variance is a pre-set time, such as 2 ms.

In certain implementations, the step of determining the authenticity further comprises determining that the component is not authentic when component run time is less than a lower run time threshold, the lower run time threshold being based on the electronic device run time.

In certain implementations, the lower run time threshold is the electronic device run time minus a lower variance.

In certain implementations, the lower variance is a percentage of the electronic device run time, for example, 20% or 10%. In certain implementations, the lower variance is a pre-set time, such as 2 ms.

In certain implementations, the step of determining the authenticity comprises determining that the component is authentic when the component run time is between the upper run time threshold and the lower run time threshold.

In certain implementations, the method further comprises: generating parameters for the cryptographic algorithm, the parameters including the first algorithm input to the cryptographic algorithm and including a second parameter.

In certain implementations, the second parameter is the electronic device run time and the method further comprises: recording an algorithm output as the result output when the cryptographic algorithm has been performed for the electronic device run time on the electronic device. In certain implementations, generating the electronic device run time comprises randomly selecting a run time, the run time being less than a maximum run time.

In certain implementations, the second parameter comprises matching data indicative of the result output and when the cryptographic algorithm on the electronic device has produced the result output, the run time of the algorithm is recorded as the electronic device run time.

In certain implementations, the matching data has a smaller number of bits than the result output.

In certain implementations, the second parameter is the component run time and the method further comprises: recording an algorithm output as the result output when the cryptographic algorithm has been performed for the component run time on the component. The component may send the result output to the electronic device.

In certain implementations, the electronic device performs the cryptographic algorithm until it returns the result output and records the electronic device run time.

In certain implementations, the electronic device generates the parameters for the cryptographic algorithm. In certain implementations, the electronic device sends the parameters to the component.

In certain implementations, the component run time is determined using an internal timer of the component.

In certain implementations, the component sends an indication of the component run time to the electronic device. The indication of the component may be the recorded supply run time, or other data indicating the supply run time.

In certain implementations, the electronic device performs determination of authenticity of the component.

In certain implementations, the method further comprises: when the algorithm output on the component matches the result output, recording the run time of the algorithm on the component as the component run time. The recorded supply run time can then be used with the electronic device run time in the determination of authenticity.

In certain implementations, the method further comprises: when the result output is achieved on the electronic device, continuing performance of the cryptographic algorithm on the electronic device until a maximum run time is reached, the maximum run time measured from input of the first algorithm input, and/or when the result output is achieved on the component, continuing performance of the cryptographic algorithm on the component until the maximum run time is reached, the maximum run time measured from input of the first algorithm input.

In certain implementations, the method further comprises: performing one or more dummy checks and/or comparisons of the algorithm output and the result output during performing the cryptographic algorithm on the electronic device. For example, after each run of the cryptographic algorithm, the electronic device may check if the result is equal to an arbitrary result and then continue the process regardless.

In certain implementations, when the maximum run time has been reached on the component and the result output has not been generated on the component, the component sends an error message to the electronic device.

In certain implementations, performing the cryptographic algorithm on the electronic device comprises performing the cryptographic algorithm on a security device of the electronic device. The security device of the electronic device may be integral with the electronic device SoC or the security device of the electronic device may be integral with another component of the electronic device, such as a second component, for example a fusing component or an electronic unit. In certain implementations, the security device of the electronic device comprises a processor and optionally, one or more hardware encryption components, such as a hardware AES chip, a hardware DES chip and/or a hardware SHA chip.

In certain implementations, performing the cryptographic algorithm on the component comprises performing the cryptographic algorithm on a security device of the component. In certain implementations, the security device of the component comprises a processor and optionally, one or more hardware encryption components, such as a hardware AES chip, a hardware DES chip and/or a hardware SHA chip.

In certain implementations, the method further comprises: generating the electronic device run time and corresponding electronic device intermediate data from a look-up table, retrieving, by the component, component intermediate data from a look-up table on the component based on the component run time, and determining the component is authentic when the electronic device intermediate data and the component intermediate data match. The component intermediate data and the electronic device intermediate data act as an indication of the component and electronic device run times respectively. In this way, checking if the component and electronic device intermediate data match determines the authenticity of the component based on the component run time and the electronic device run time.

In certain implementations, generating the electronic device run time and corresponding electronic device intermediate data from the look-up table comprises selecting a row in the look-up table, the row including a run time and a piece of intermediate data.

In certain implementations, the selection may be a random selection from a group of existing rows.

In certain implementations, retrieving, by the component, component intermediate data from a look-up table on the component based on the component run time comprises selecting a row in the look-up table, the row having a run time matching the component run time. The row run time and the component run time may be considered matching when the component run time is within a specified range on the row run time. For example, the specified range may be +/−20% or 10% of the row run time, or the specified range may be +/−2 ms of the row run time. In certain implementations, if the component run time does not match to a run time in the look-up table, the component communicates an error to the electronic device.

The parameters, for example the first algorithm input and/or the electronic device run time and/or the matching data and/or the component run time and/or the look-up table may be changed. This changing of parameters may occur periodically, at start-up of the electronic device, or on initiation of communication between the electronic device and the component.

The look-up table may be stored and shared between the electronic device and the component in baseline software or may be programmed during personalisation.

In certain implementations, the electronic device intermediate data and the component intermediate data are each a key, seed, salt or algorithm.

In certain implementations, the cryptographic algorithm is hardware assisted. The cryptographic algorithm may be a SHA, AES, DES, 3DES or any other hardware assisted algorithm.

In certain implementations, the cryptographic algorithm is a processor-based algorithm. A processor-based algorithm may be performed on a general-purpose processor.

In certain implementations, the method further comprises: performing a second cryptographic algorithm on the electronic device, starting with a second algorithm input, performing the second cryptographic algorithm on the component, starting with the second algorithm input, determining the authenticity of the component based on a second electronic device run time and a second component run time, wherein the second electronic device run time is a run time of the second cryptographic algorithm on the electronic device from input of the second algorithm input until a second result output is generated, and the second component run time is a run time of the second cryptographic algorithm on the component from input of the second algorithm input until the second result output is generated.

In certain implementations, the cryptographic algorithm is a processor-based algorithm and the second cryptographic algorithm is a hardware-assisted algorithm.

There is further provided a method for determining authenticity of a component for an electronic device, the method comprising: generating a first algorithm input for a cryptographic algorithm, selecting an electronic device run time from a set of predetermined run times, wherein each of the predetermined run times has corresponding intermediate data, setting the intermediate data corresponding to the selected run time as electronic device intermediate data, performing the cryptographic algorithm on the electronic device, starting with the first algorithm input, recording an algorithm output as a result output when the cryptographic algorithm has been performed for the electronic device run time on the electronic device, sending the first algorithm input and the result output to the component, performing the cryptographic algorithm on the component, starting with the first algorithm input, recording the run time of the algorithm on the component as the component run time, when the algorithm output on the component matches the result output, retrieving, from memory on the component, component intermediate data corresponding to the component run time, determining the component is authentic when the electronic device intermediate data and the component intermediate data match.

In certain implementations, the electronic device intermediate data is a key, and the component intermediate data is a key. In certain implementations, the electronic device intermediate data is a seed, and the component intermediate data is a seed. In certain implementations, the electronic device intermediate data is an algorithm, and the component intermediate data is an algorithm.

In certain implementations, each of the predetermined run times corresponds to a different key, seed or algorithm.

There is further provided a method for determining authenticity of a component for an electronic device, the method comprising: performing a cryptographic algorithm on a part of the electronic device, starting with a first algorithm input, performing the cryptographic algorithm on the component, starting with the first algorithm input, determining authenticity of the component based on an electronic device run time and a component run time, wherein the electronic device run time is a run time of the cryptographic algorithm on the part of the electronic device from input of the first algorithm input until a result output is generated, and the component run time is a run time of the cryptographic algorithm on the component from input of the first algorithm input until the result output is generated.

In certain implementations, the part of the electronic device system is a second component.

There is further provided an electronic system comprising: an electronic device; and a component, the component being communicatively connectable to the electronic device, wherein the electronic system is configured to: perform a cryptographic algorithm on the electronic device, starting with a first algorithm input, perform the cryptographic algorithm on the component, starting with the first algorithm input, and determine authenticity of the component based on an electronic device run time and a component run time, wherein the electronic device run time is a run time of the cryptographic algorithm on the electronic device from input of the first algorithm input until a result output is generated, and the component run time is a run time of the cryptographic algorithm on the component from input of the first algorithm input until the result output is generated.

In certain embodiments, the electronic device comprises an electronic device security device, and/or the component comprises a component security device. In certain embodiments, the electronic device comprises a second component and optionally, the second component comprises a security device that acts as the electronic device security device. In certain embodiments, the security device of the electronic device and/or component comprises a processor and optionally, one or more hardware encryption components, such as a hardware AES chip, a hardware DES chip and/or a hardware SHA chip.

In any of the implementations/embodiments described herein, the components may be connected via any shared bus, such as I2C or peer-to-peer.

The methods and systems described above may be employed in any combination. The optional features described above are equally applicable to all of the described methods and systems and are not limited to the particular method/system with which they are described. The essential features of any of the methods described may be optional features of any other method described.

From the foregoing disclosure and the following detailed description of various examples, it will be apparent to those skilled in the art that the present disclosure provides a significant advance in the art of determining the authenticity of a component an electronic system. Additional features and advantages of various examples will be better understood in view of the detailed description provided below.

As used herein, the term 'leader' is equivalent to the term 'master' and can be used interchangeably throughout without changing the meaning. As used herein, the term 'follower' is equivalent to the term 'slave' and can be used interchangeably throughout without changing the meaning. Both terms 'master' and 'slave' take their usual meanings in the art, for example, as used in the official I2C specification.

BRIEF DESCRIPTION OF THE DRAWINGS

The above-mentioned and other features and advantages of the present disclosure, and the manner of attaining them, will become more apparent and will be better understood by reference to the following description of examples taken in conjunction with the accompanying drawings. Like reference numerals are used to indicate the same element throughout the specification.

DETAILED DESCRIPTION OF THE DRAWINGS

Figure 1:
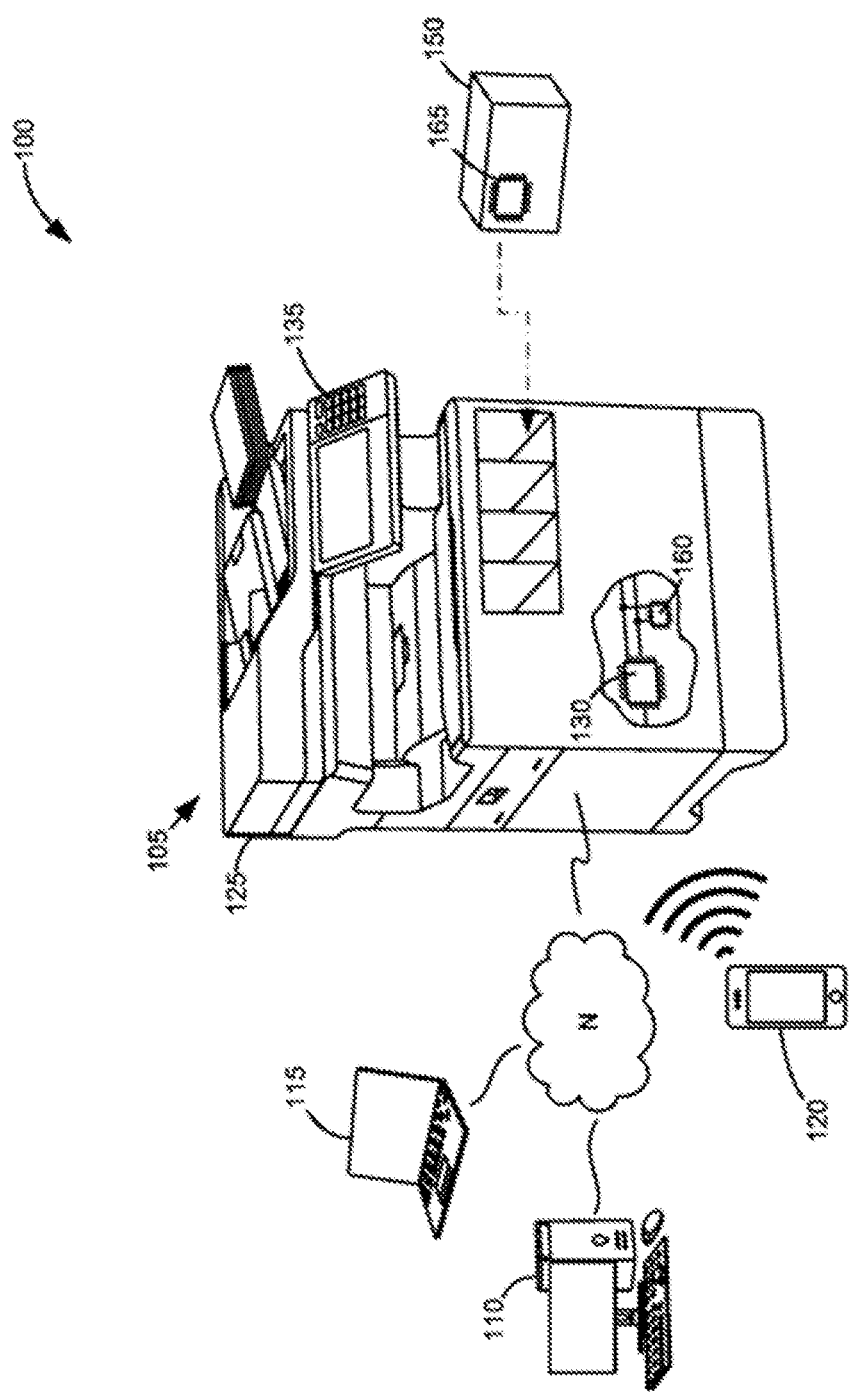
FIG. 1 is a diagrammatic view of an imaging system.

It is to be understood that the disclosure is not limited to the details of construction and the arrangement of components set forth in the following description or illustrated in the drawings. The disclosure is capable of other examples and of being practiced or of being carried out in various ways. For example, other examples may incorporate structural, chronological, process, and other changes. Examples merely typify possible variations. Individual components and functions are optional unless explicitly required, and the sequence of operations may vary. Portions and features of some examples may be included in or substituted for those of others. The scope of the disclosure encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Further, the use of the terms "a" and "an" herein do not denote a limitation of quantity but rather denote the presence of at least one of the referenced item.

In addition, it should be understood that examples of the disclosure include both hardware and electronic components or modules that, for purposes of discussion, may be illustrated and described as if the majority of the components were implemented solely in hardware.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block or combinations of blocks in the diagrams discussed in detail in the description below.

These computer program instructions may also be stored in a non-transitory computer-readable medium that may direct a computer or other programmable data processing apparatus to function in a particular manner, such that the instructions stored in the computer-readable medium may produce an article of manufacture, including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks.

Accordingly, blocks of the diagrams support combinations of means for performing the specified functions, combinations of steps for performing the specified functions and program instruction means for performing the specified functions. It will also be understood that each block of the diagrams, and combinations of blocks in the diagrams, can be implemented by special purpose hardware-based computer systems that perform the specified functions or steps or combinations of special purpose hardware and computer instructions.

Disclosed are example systems and methods for determining the authenticity of a component in an electronic system, such as an imaging/printer system.

Referring to FIG. 1, there is shown a diagrammatic view of an imaging system 100 used in association with the present disclosure. Imaging system 100 includes an imaging device 105 used for printing images on sheets of media. Image data of the image to be printed on a media sheet may be supplied to imaging device 105 from a variety of sources such as a computer 110, laptop 115, mobile device 120, scanner 125 of the imaging device 105, or like computing device. The sources directly or indirectly communicate with imaging device 105 via wired and/or wireless connections.

Imaging device 105 includes an imaging device component 130 and a user interface 135. Imaging device component 130 may include a processor and associated memory. In some examples, imaging device component 130 may be formed as one or more Application Specific Integrated Circuits (ASICs) or System-on-Chip (SoCs). Memory may be any memory device which stores data and may be used with or capable of communicating with processor. For example, memory may be any volatile or non-volatile memory or combination thereof such as, for example, random access memory (RAM), read-only memory (ROM), flash memory and/or non-volatile RAM (NVRAM) for storing data. Optionally, imaging device component 130 may control the processing of print data. Optionally, imaging device component 130 may also control the operation of a print engine during printing of an image onto a sheet of media.

In one example, imaging device 105 may employ an electronic authentication scheme to authenticate consumable supply items and/or replaceable units installed in imaging device 105. In FIG. 1, a representative consumable supply item/replaceable item, such as a toner cartridge 150, is shown (other consumable/replaceable supply items can equally be used in addition or instead, such as imaging units and fusers). Supply item 150 may be installed in a corresponding storage area in imaging device 105. To perform authentication of supply item 150, imaging device 105 may utilize an imaging device security device 160 incorporated in imaging device 105 and a supply item security device 165 of supply item 150.

In one example, imaging device security device 160 in imaging device 105 may be similar to or the same as supply item security device 165 in consumable supply item 150. Optionally, the imaging device security device 160 may be programmed differently from supply item security device 165. Imaging device security device 160 and supply item security device 165 may operate in conjunction with one another to perform authentication functions, as will be explained in greater detail below.

Figure 2:
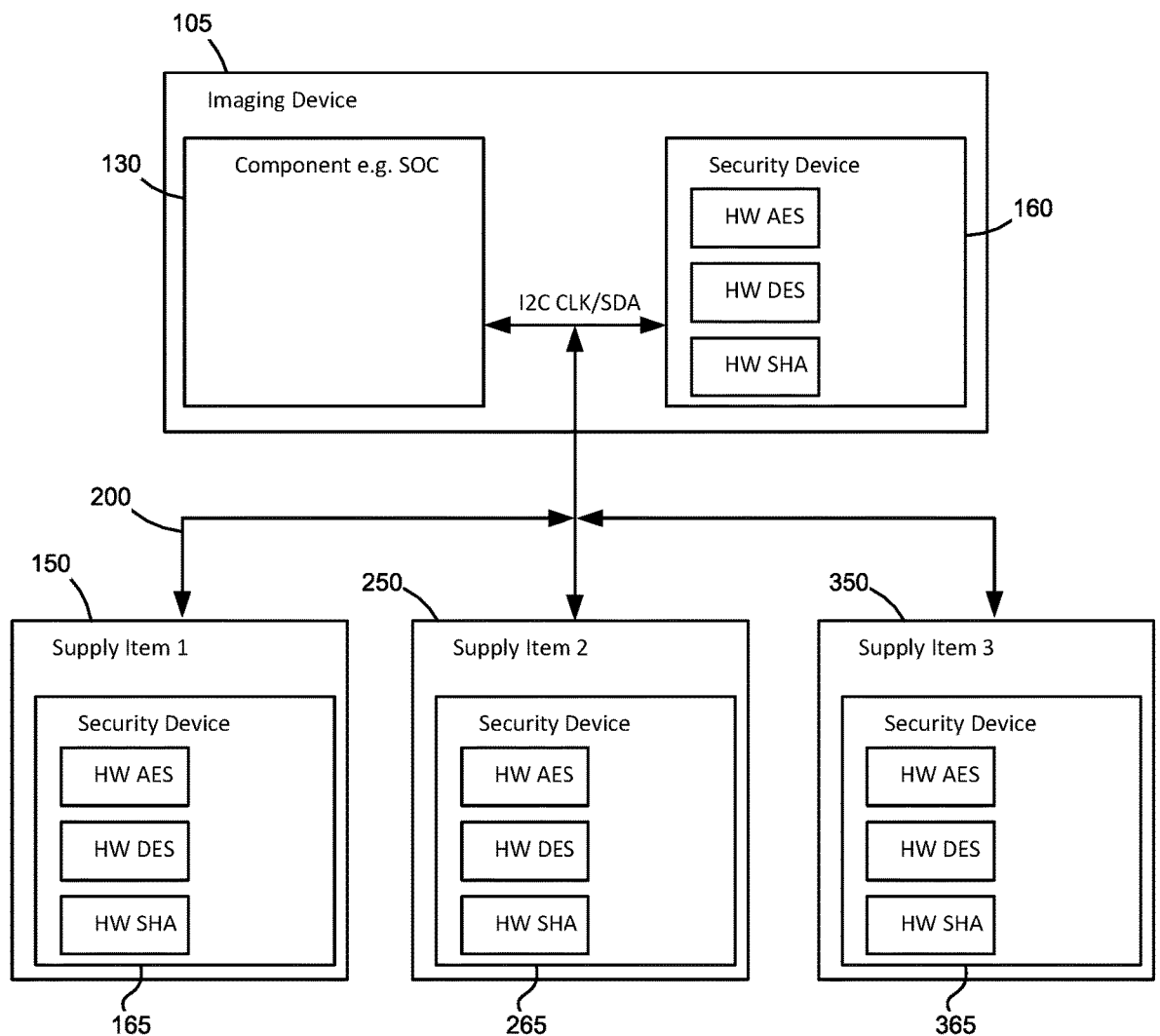
FIG. 2 is a block diagram depicting communication between the imaging device shown in FIG. 1 and three supply items.

FIG. 2 is a block diagram depicting imaging device 105 and supply items 150, 250, 350. In this example, a shared bus system 200 may be employed to control various subassemblies and components (such as supply items 150, 250, 350) and/or obtain status reports thereof. The shared bus system 200 may be an Inter-Integrated Circuit (I2C) interface comprising a serial clock line (SCL) and serial data line (SDA). Various components such as an imaging unit, a toner cartridge 150, and other follower or supply devices and/or addressable components and subassemblies capable of receiving and/or handling data such as a fuser, a laser scan unit, and a media feed mechanism, may be connected to shared bus system 200 (for simplicity FIG. 2 only shows supply items 150, 250, 350 connected to the shared bus system 200). Imaging device component 130 may be generally configured to control a bus leader, which acts as the leader of the shared bus system 200. The bus leader may be implemented as firmware of the imaging device leader component 130.

Imaging device security device 160 may operate in conjunction with bus leader to facilitate establishing connections between imaging device component 130 and various components and subassemblies (such as supply item 150) connected to shared bus system 200. For example, imaging device security device 160 may be configured to provide authentication functions, safety and operational interlocks, and/or address change functions related to supply item 150 and other addressable components.

In general, both the imaging device security device 160 and supply item security device 165 are configured to perform the same cryptographic function F and the results of the calculation of the cryptographic function F are compared to determine the authenticity of the supply item security device 165 and therefore the supply item 150. This is described further below. In this application, cryptographic function and cryptographic algorithm are used interchangeably.

The supply item security device 165 comprises a processor and hardware encryption components, including a hardware AES component, a hardware DES component and a hardware SHA component. A plurality of the hardware encryption components may be located on the same chip. In other embodiments, one or more of these hardware components may be omitted.

The imaging device security device 160 may also comprise a processor and hardware encryption components, including a hardware AES chip, a hardware DES chip and a hardware SHA chip. In other embodiments, one or more of these hardware chips may be omitted. The supply item security device 165 and the imaging device security device 160 may have the same components.

The imaging device 105 may attempt to authenticate the supply item 150 at any point, for example, at fixed time intervals. Additionally/alternatively, the imaging device 105 may attempt to authenticate the supply item 150 shortly after a Power On Reset (POR) or shortly after the supply item 150 is installed in the imaging device.

Figure 3:
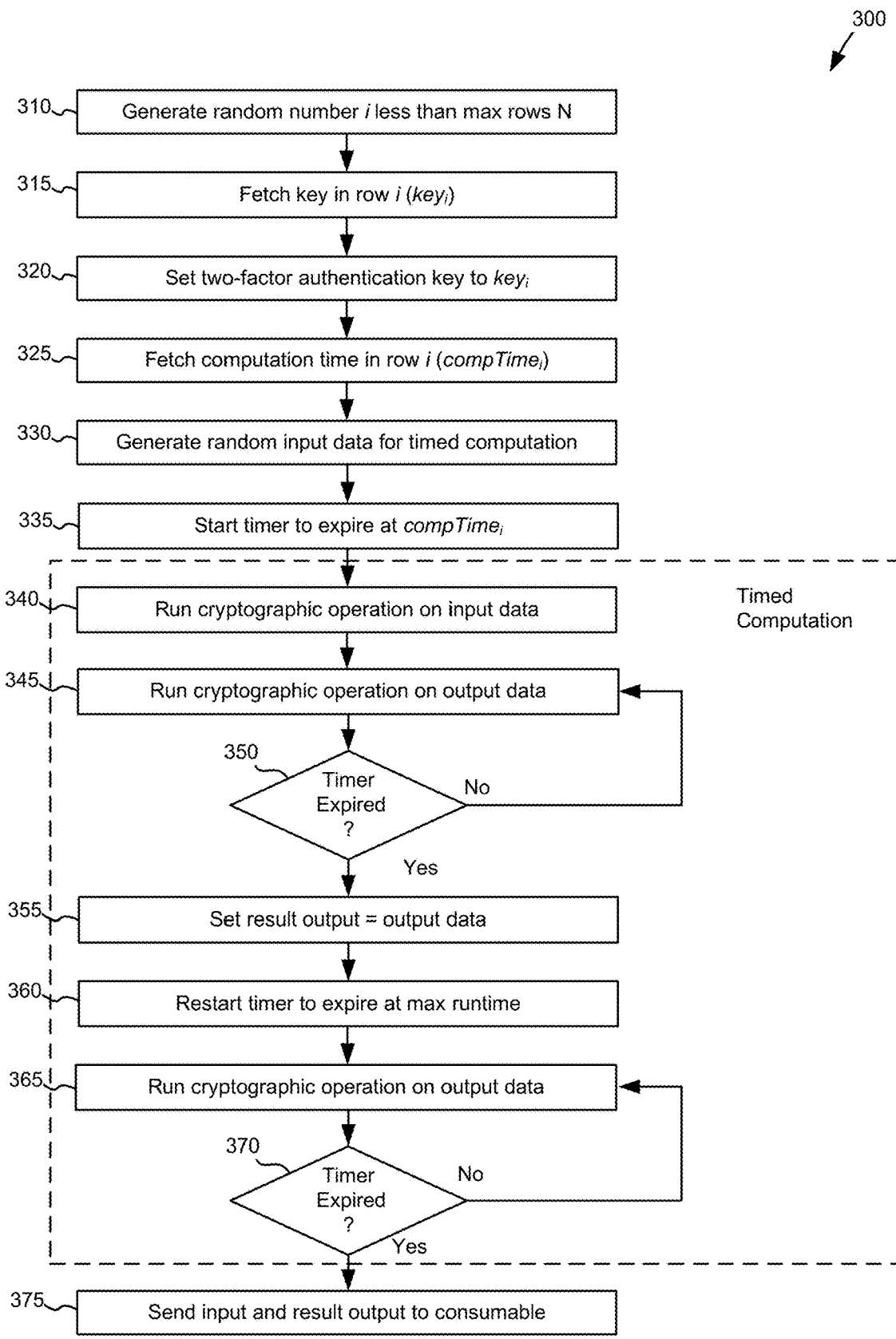
FIG. 3 is a flow diagram illustrating a method associated with the imaging device of FIG. 1.
Figure 4:
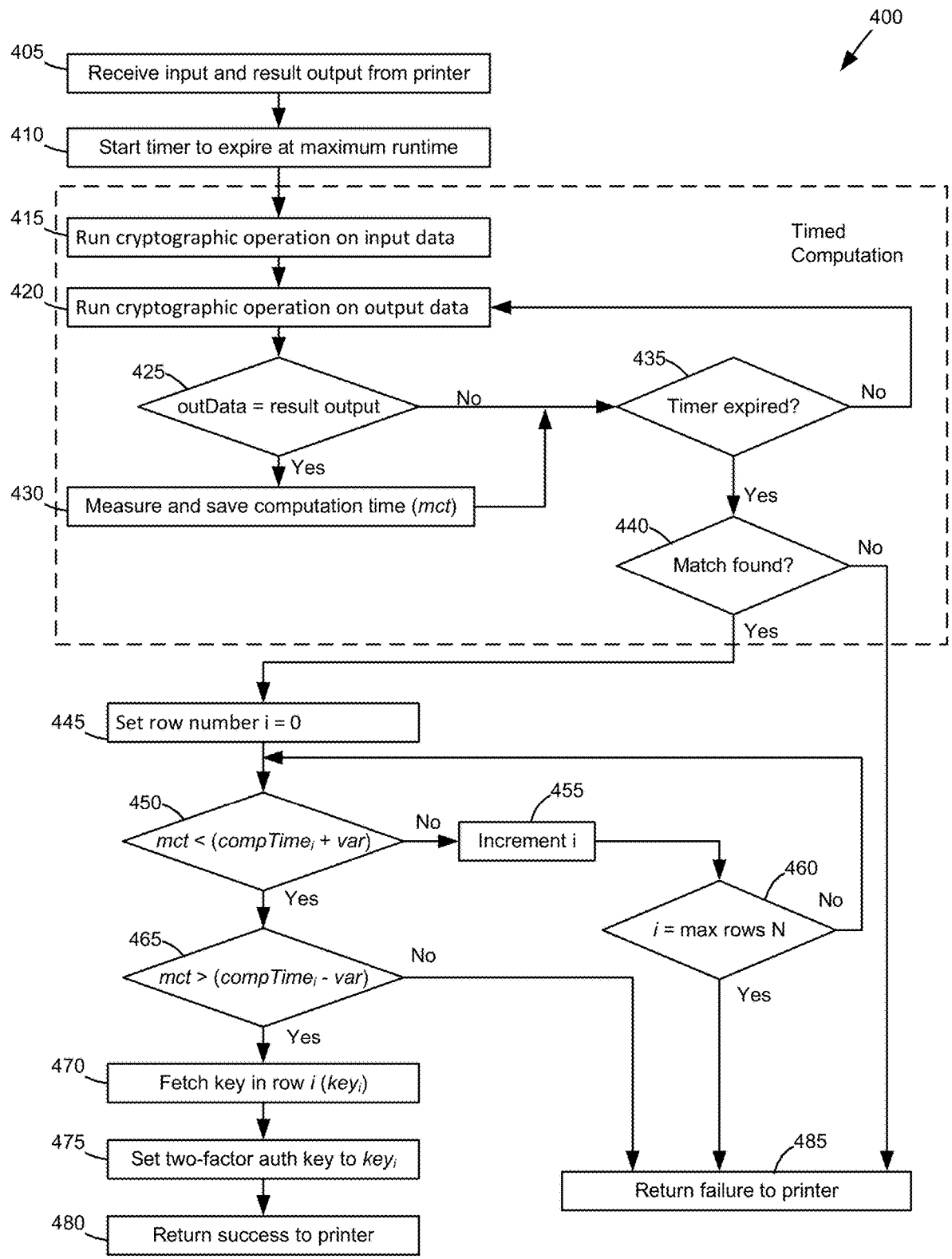
FIG. 4 is a flow diagram illustrating a method associated with the supply items of FIG. 2.

Specifically, a method 300, 400 of verifying the authenticity of the supply item 150 is detailed below with reference to FIG. 3 and FIG. 4. The method 300 may be implemented using the arrangement/configuration described in relation to FIG. 1 and/or FIG. 2. FIG. 3 shows steps performed on the imaging device and FIG. 4 shows steps performed on the supply item.

In blocks 310 to 330, the imaging device generates a first algorithm input and an imaging device run time. In other embodiments this may be done by randomly generating these parameters, or by selecting them from a group of predetermined values. In this embodiment, the parameters are generated using a look-up table.

At block 310, a random number i is generated, the number being less than N, which is the number of rows in the look-up table.

In block 315, the key in row i is fetched from the look-up table and at block 320, the key in row i is set to the two-factor authentication key.

In other embodiments, where two-factor authentication is not used, the look-up table may not contain keys and may only contain run times. In this case blocks 315 and 320 may be skipped.

At block 325, the imaging device run time is fetched from row i of the look-up table. At block 330, a random first algorithm input is generated. At block 335, the timer is set to expire at the imaging device run time.

At block 340, the cryptographic algorithm is run on the imaging device using the first algorithm input. At block 345, the cryptographic algorithm is run on the output of the cryptographic algorithm. At block 350, a check is done as to whether the timer is expired. If not, the cryptographic algorithm continues at block 345. If the timer has expired, then the output is set as the result output at block 355.

The timer is then restarted at block 360 to expire at a maximum run time. The cryptographic algorithm is run on the output of the cryptographic algorithm. At block 370, a check is done as to whether the timer is expired. If not, the cryptographic algorithm continues at block 365. When the check at block 370 determines that the maximum run time has expired, the first algorithm input and the result output are sent to the supply item 150.

In other embodiments, performing the algorithm may not continue to a maximum run time and in this case, blocks 360, 365 and 370 may be skipped.

FIG. 4 shows method 400 which is performed on the supply item 150 during determination of authenticity of supply item 150.

At block 405 the first algorithm input and the result output are received at the supply item 150. At block 410, the supply item 150 starts an internal timer to expire at a maximum run time.

At block 415, the cryptographic algorithm is performed on the supply item using the first algorithm input. At block 420 the cryptographic algorithm is performed on the output of the algorithm. At block 425, a check is done as to whether the output of the cryptographic algorithm matches the result output. If it does not, a further check is done at block 435 as to whether the timer has expired. If not, then the cryptographic algorithm is run on the output of the algorithm at block 420.

If the output does match the result output at block 425, then the time on the timer is saved as the supply item run time at block 430. Then, at block 435, the check as to whether the timer has expired is performed and if it is not, then the cryptographic algorithm continues at block 420.

Once the timer has expired and is checked at block 435, a further check as to whether a match has been found is performed. If the supply item run time has been recorded, then a match has been found and the process continues at block 445. If no match has been found, then the supply item 150 returns a failure to the imaging device at block 485.

At blocks 445 to 475, the two-factor authentication key is found for the supply item from a look-up table. In other embodiments not utilizing the two-factor authentication, these steps may be skipped and the supply item run time may be sent to the imaging device. The imaging device may then compare the imaging device run time and the supply item run time to determine authenticity of the supply item 150. If the supply item run time is less than the imaging device run time plus an upper variance and greater than the imaging device run time minus a lower variance, then the supply item is authenticated. If either of these conditions is not met, then the supply item is not authenticated.

At block 445, the row number is set to 0. At block 450, it is checked if the supply item run time is less than an upper threshold of that row, the upper threshold being the row run time plus a variance. If not, then the row number is increased by one at block 455. At block 460, if the row number is equal to the maximum rows, then a failure is sent to the imaging device at block 485. If the row number is not equal to the maximum rows, then the process continues to block 450 and checks if the supply item run time is less than the upper threshold of the next row.

If the supply item run time is less than an upper threshold of the row at block 450, a further check is done at block 465 as to whether the supply item run time is greater than a lower threshold of the row, the lower threshold being a row run time plus a variance. If the supply item run time is not greater than the lower threshold of the row, a failure is sent to the imaging device at block 485. If the supply item run time is greater than the lower threshold of the row then the key in the row is fetched at block 470 and set as the two-factor authentication key in block 475. The success is then sent to the imaging device in block 480. The key is then used in an authentication operation with the imaging device in block 320.

At the imaging device, the key set in block 320 is used in an authentication operation with the supply item. If the key set by the supply item in block 475 is the same as the imaging device key, then the authentication operation will succeed and the supply is authenticated. The two-factor authentication means that not only does the supply item have to replicate the cryptographic algorithm in the correct run time, but it also needs access to the correct look-up table linking keys to run times. So, use of the keys improves the security of the method.

The above has been described in relation to a specific implementation/embodiment. However, modifications can be implemented within the scope of the application, some of which are detailed below.

In the above-described embodiment, the parameters generated are the first algorithm input and the imaging device run time. The first algorithm input and the result output are sent to the supply item and the supply item sends an indication of the supply item run time to the imaging device.

In other embodiments, the parameters generated may be the first algorithm input and match data. The imaging device measures an imaging device run time to achieve a result output that matches the match data. The match data is sent to the supply item which performs the cryptographic algorithm and returns the supply item run time or an indication of the supply item run time.

In other embodiments, the first algorithm input and the supply item run time may be generated and sent to the supply item. The supply item may send the result output to the imaging device. The imaging device may measure the imaging device run time for performing the algorithm from the first algorithm input to the result output. The generated supply item run time can then be used along with the measured imaging device run time to determine authenticity.

The first algorithm input and match data may be sent to the supply item and an imaging device component such as a second supply item. Then the supply item run time and the imaging device run time provided by the component of the imaging device can be used to determine authenticity of the supply item. This method may be used when the component, such as the second supply item is likely to be authentic, for example a fuser or imaging unit.

In the above implementations/embodiments, the various components are configured as leader/follower components. This is purely optional and other communication busses may be used.

Relatively apparent advantages of the many embodiments include, but are not limited to, providing an authentication system/method which is more difficult to satisfy/replicate due to the increased required processing power.

It will be understood that the example applications described herein are illustrative and should not be considered limiting. It will be appreciated that the actions described and shown in the example flowcharts may be carried out or performed in any suitable order. It will also be appreciated that not all of the actions described in FIG. 3 need to be performed in accordance with the example embodiments of the disclosure and/or additional actions may be performed in accordance with other example embodiments of the disclosure.

Many modifications and other embodiments of the disclosure set forth herein will come to mind to one skilled in the art to which these disclosures pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Further disclosure is provided below.

Statement 1: A method for determining authenticity of a component for an electronic device, the method comprising:

performing a cryptographic algorithm on the electronic device, starting with a first algorithm input, performing the cryptographic algorithm on the component, starting with the first algorithm input, determining authenticity of the component based on an electronic system device run time and a component run time, wherein the electronic system device run time is a run time of the cryptographic algorithm on the electronic system device from input of the first algorithm input until a result output is generated, and the component run time is a run time of the cryptographic algorithm on the component from input of the first algorithm input until the result output is generated.

Statement 2: The method of statement 1, wherein the step of determining authenticity comprises determining that the component is not authentic when the component run time is greater than an upper run time threshold, the upper run time threshold being the electronic device system run time plus an upper variance.

Statement 3: The method of statement 2, wherein the step of determining the authenticity further comprises determining that the component is not authentic when component run time is less than a lower run time threshold, the lower run time threshold being the electronic device system run time minus a lower variance.

Statement 4: The method of statement 3, wherein the step of determining the authenticity comprises determining that the component is authentic when the component run time is between the upper run time threshold and the lower run time threshold.

Statement 5: The method of statement 1, the method further comprising: generating parameters for the cryptographic algorithm, the parameters including the first algorithm input to the cryptographic algorithm and including a second parameter.

Statement 6: The method of statement 5, wherein the second parameter is the electronic device system run time and wherein the method further comprises: recording an algorithm output as the result output when the cryptographic algorithm has been performed for the electronic device system run time on the electronic device.

Statement 7: The method of statement 5, wherein the second parameter comprises matching data indicative of the result output and when the cryptographic algorithm on the electronic device system has produced the result output, the run time of the algorithm is recorded as the electronic device system run time.

Statement 8: The method of statement 7, wherein when the algorithm output on the component matches the result output, recording the run time of the algorithm on the component as the component run time.

Statement 9: The method of statement 1, the method further comprising: when the result output is achieved on the electronic device, continuing performance of the cryptographic algorithm on the electronic device system until a maximum run time is reached, the maximum run time measured from input of the first algorithm input, and/or when the result output is achieved on the component, continuing performance of the cryptographic algorithm on the component until the maximum run time is reached, the maximum run time measured from input of the first algorithm input.

Statement 10: The method of statement 9, wherein when the maximum run time has been reached on the component and the result output has not been generated on the component, the component sends an error message to the electronic device.

Statement 11: The method of statement 1, the method further comprising: generating the electronic device system run time and a corresponding electronic device system intermediate data from a look-up table, retrieving, by the component, component intermediate data from a look-up table on the component based on the component run time, and determining the component is authentic when the electronic device system intermediate data and the component intermediate data match.

Statement 12: The method of statement 11, wherein the electronic device system intermediate data and the component intermediate data are each a key, seed, salt or algorithm.

Statement 13: The method of statement 1, wherein the cryptographic algorithm is hardware assisted.

Statement 14: The method of statement 1, wherein the cryptographic algorithm is a processor-based algorithm.

Statement 15: The method of statement 1, wherein the method further comprises: performing a second cryptographic algorithm on the electronic device, starting with a second algorithm input, performing the second cryptographic algorithm on the component, starting with the second algorithm input, determining the authenticity of the component based on a second electronic device system run time and a second component run time, wherein the second electronic device system run time is a run time of the second cryptographic algorithm on the electronic device system from input of the second algorithm input until a second result output is generated, and the second component run time is a run time of the second cryptographic algorithm on the component from input of the second algorithm input until the second result output is generated.

Statement 16: A method for determining authenticity of a component for an electronic device, the method comprising: generating a first algorithm input for a cryptographic algorithm, selecting an electronic device system run time from a set of predetermined run times, wherein each of the predetermined run times has corresponding intermediate data, setting the intermediate data corresponding to the selected run time as electronic device system intermediate data, performing the cryptographic algorithm on the electronic device, starting with the first algorithm input, recording an algorithm output as a result output when the cryptographic algorithm has been performed for the electronic device system run time on the electronic device, sending the first algorithm input and the result output to the component, performing the cryptographic algorithm on the component, starting with the first algorithm input, recording the run time of the algorithm on the component as the component run time, when the algorithm output on the component matches the result output, retrieving, from memory on the component, component intermediate data corresponding to the component run time, determining the component is authentic when the electronic device system intermediate data and the component intermediate data match.

Statement 17: The method of statement 16, wherein the electronic device system intermediate data is a key, and the component intermediate data is a key.

Statement 18: The method of statement 17, wherein each of the predetermined run times corresponds to a different key.

Statement 19: A method for determining authenticity of a component for an electronic device, the method comprising: performing a cryptographic algorithm on a part of the electronic device, starting with a first algorithm input, performing the cryptographic algorithm on the component, starting with the first algorithm input, determining authenticity of the component based on an electronic device system run time and a component run time, wherein the electronic device system run time is a run time of the cryptographic algorithm on the part of the electronic device system from input of the first algorithm input until a result output is generated, and the component run time is a run time of the cryptographic algorithm on the component from input of the first algorithm input until the result output is generated.

Statement 20: An electronic system comprising: an electronic device; and a component, the component being communicatively connectable to the electronic device, wherein the electronic system is configured to: perform a cryptographic algorithm on the electronic device, starting with a first algorithm input, perform the cryptographic algorithm on the component, starting with the first algorithm input, and determine authenticity of the component based on an electronic device run time and a component run time, wherein the electronic device run time is a run time of the cryptographic algorithm on the electronic device from input of the first algorithm input until a result output is generated, and the component run time is a run time of the cryptographic algorithm on the component from input of the first algorithm input until the result output is generated.

What is claimed:

1. A method for determining authenticity of a supply item for an imaging device, the method comprising:
   generating a first algorithm input for a cryptographic algorithm,
   selecting an imaging device run time from a set of predetermined run times, wherein each of the predetermined run times has corresponding intermediate data,
   setting the intermediate data corresponding to the selected run time as imaging device intermediate data,
   performing the cryptographic algorithm on the imaging device, starting with the first algorithm input,
   recording an algorithm output as a result output when the cryptographic algorithm has been performed for the imaging device run time on the imaging device,
   sending the first algorithm input and the result output to the supply item,
   performing the cryptographic algorithm on the supply item, starting with the first algorithm input,
   recording the run time of the algorithm on the supply item as a supply item run time, when the algorithm output on the supply item matches the result output,
   retrieving, from memory on the supply item, supply item intermediate data corresponding to the supply item run time,
   determining the supply item is authentic when the imaging device intermediate data and the supply item intermediate data match.

2. The method of claim 1, wherein the imaging device intermediate data is a key, and the supply item intermediate data is a key.

3. The method of claim 2, wherein each of the predetermined run times corresponds to a different key.

* * * * *